(12) United States Patent
Iggulden et al.

(10) Patent No.: US 7,415,102 B2
(45) Date of Patent: *Aug. 19, 2008

(54) METHOD AND APPARATUS FOR SETTING PROGRAMMABLE FEATURES OF AN APPLIANCE

(75) Inventors: Jerry Iggulden, Santa Monica, CA (US); Kyle Fields, El Dorado Hills, CA (US)

(73) Assignee: pointSET Corporation, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/745,323

(22) Filed: May 7, 2007

(65) Prior Publication Data

US 2007/0206740 A1 Sep. 6, 2007

Related U.S. Application Data

(63) Continuation of application No. 10/938,057, filed on Sep. 9, 2004, now Pat. No. 7,215,746, which is a continuation of application No. 10/155,531, filed on May 24, 2002, now Pat. No. 6,882,712, which is a continuation-in-part of application No. 09/415,299, filed on Oct. 8, 1999, now Pat. No. 6,483,906, which is a continuation-in-part of application No. 09/351,270, filed on Jul. 12, 1999, now Pat. No. 6,256,378, which is a continuation-in-part of application No. 09/235,709, filed on Jan. 22, 1999, now Pat. No. 6,415,023.

(51) Int. Cl.
*H04M 11/00* (2006.01)

(52) U.S. Cl. ............................. 379/102.01; 379/102.03
(58) Field of Classification Search ............ 379/102.03, 379/102.01, 93.17, 90.01, 102.02, 110.01
See application file for complete search history.

(56) References Cited

U.S. PATENT DOCUMENTS 3,407,301 A  10/1968  Kovanic (Continued)

FOREIGN PATENT DOCUMENTS

DE  19750372  5/1999

(Continued)

OTHER PUBLICATIONS

Shear, D., *GoingGlobal in the Real World: Putting an Embedded System on the Internet*, EDN Electrical Design News, US, Cahners Publishing Co., Newton, Massachusetts, vol. 42, No. 19, Sep. 12, 1997, pp. 37-46.

(Continued)

*Primary Examiner*—Stella L Woo
(74) *Attorney, Agent, or Firm*—Blakely Sokoloff Taylor & Zafman LLP

(57) ABSTRACT

An interactive interface facilitates the setting of preferences and other programmable parameters of an appliance. The interface is hosted by a server on a global computer network. The appliance owner initiates a connection to the server and is presented with a graphical user interface for setting the preferences and features of the appliance. Once the desired settings have been made, they are downloaded to the appliance either directly from the server or the appliance owner's computer or indirectly using a portable transfer device.

24 Claims, 7 Drawing Sheets

U.S. PATENT DOCUMENTS

| | | | |
|---|---|---|---|
| 3,737,566 A | 6/1973 | Baer et al. | |
| 3,993,861 A | 11/1976 | Baer | |
| 4,034,362 A | 7/1977 | Balanca et al. | |
| 4,329,684 A | 5/1982 | Monteath et al. | |
| 4,807,031 A | 2/1989 | Broughton et al. | |
| 4,962,522 A | 10/1990 | Marian | |
| 4,999,617 A | 3/1991 | Uemura et al. | |
| 5,153,568 A | 10/1992 | Shaw | |
| 5,228,077 A | 7/1993 | Darbee | |
| 5,231,488 A | 7/1993 | Mohrbacher et al. | |
| 5,268,995 A | 12/1993 | Diefendorff et al. | |
| 5,309,509 A | 5/1994 | Cocklin et al. | |
| 5,333,054 A | 7/1994 | Tanaka et al. | |
| 5,347,110 A | 9/1994 | Audebert et al. | |
| 5,410,326 A | 4/1995 | Goldstein | |
| 5,414,756 A | 5/1995 | Levine | |
| 5,488,571 A | 1/1996 | Jacobs et al. | |
| 5,521,966 A | 5/1996 | Friedes et al. | |
| 5,528,740 A | 6/1996 | Hill et al. | |
| 5,535,147 A | 7/1996 | Jacobs et al. | |
| 5,553,123 A | 9/1996 | Chan et al. | |
| 5,570,297 A | 10/1996 | Brzezinski et al. | |
| 5,592,188 A | 1/1997 | Doherty et al. | |
| 5,594,493 A | 1/1997 | Nemirofsky | |
| 5,600,711 A | 2/1997 | Yuen | |
| 5,636,994 A | 6/1997 | Tong | |
| 5,652,602 A | 7/1997 | Fishman et al. | |
| 5,726,645 A | 3/1998 | Kamon et al. | |
| 5,734,363 A | 3/1998 | Blouin et al. | |
| 5,745,068 A | 4/1998 | Takahashi et al. | |
| 5,746,602 A | 5/1998 | Kikinis | |
| 5,748,895 A | 5/1998 | Shiff et al. | |
| 5,752,880 A | 5/1998 | Gabai et al. | |
| 5,761,601 A | 6/1998 | Nemirofsky et al. | |
| 5,767,896 A | 6/1998 | Nemirofsky | |
| 5,774,063 A | 6/1998 | Berry et al. | |
| 5,781,125 A | 7/1998 | Godau et al. | |
| 5,801,664 A | 9/1998 | Seidensticker et al. | |
| 5,805,443 A | 9/1998 | Raffray et al. | |
| 5,815,086 A | 9/1998 | Ivie et al. | |
| 5,819,294 A | 10/1998 | Chambers | |
| 5,850,304 A * | 12/1998 | Elmers et al. | 340/825.57 |
| 5,852,615 A | 12/1998 | Holo et al. | |
| 5,873,765 A | 2/1999 | Rifkin et al. | |
| 5,880,769 A | 3/1999 | Nemirofsky et al. | |
| 5,905,486 A | 5/1999 | Brittenham et al. | |
| 5,907,350 A | 5/1999 | Nemirofsky | |
| 5,953,047 A | 9/1999 | Nemirofsky | |
| 6,049,778 A | 4/2000 | Walker et al. | |
| 6,088,621 A | 7/2000 | Woytowitz et al. | |
| 6,112,127 A | 8/2000 | Bennett | |
| 6,157,982 A | 12/2000 | Deo et al. | |
| 6,161,133 A | 12/2000 | Kikinis | |
| 6,256,378 B1 * | 7/2001 | Iggulden et al. | 379/102.03 |
| 6,281,820 B1 | 8/2001 | Fields | |
| 6,385,542 B1 | 5/2002 | Millington | |
| 6,415,023 B2 * | 7/2002 | Iggulden | 379/102.03 |
| 6,483,906 B1 * | 11/2002 | Iggulden et al. | 379/102.03 |
| 6,505,243 B1 | 1/2003 | Lortz | |
| 6,704,401 B2 | 3/2004 | Piepho et al. | |
| 6,775,603 B2 | 8/2004 | Yester et al. | |
| 6,882,712 B1 * | 4/2005 | Iggulden et al. | 379/102.03 |
| 7,215,746 B2 * | 5/2007 | Iggulden et al. | 379/102.03 |
| 2001/0043686 A1 | 11/2001 | Iggulden et al. | |
| 2002/0035429 A1 | 3/2002 | Banas | |
| 2002/0097851 A1 | 7/2002 | Daum et al. | |
| 2002/0196158 A1 | 12/2002 | Lee | |

FOREIGN PATENT DOCUMENTS

| | | |
|---|---|---|
| DE | 10064937 | 7/2002 |
| DE | 10131395 | 1/2003 |
| EP | 0754940 | 1/1997 |
| EP | 0803808 | 4/1997 |
| WO | WO 97/18636 | 5/1997 |
| WO | WO 97/30375 | 8/1997 |
| WO | WO 98/38570 | 9/1998 |
| WO | WO 00/43870 | 7/2000 |

OTHER PUBLICATIONS

Batista, Method and Apparatus for programming a device, WO 98/38570, Sep. 1998.

Steinberg et al., Method and Apparatus for Configuring a Camera, WO 97/30375, Aug. 1997.

NBX Corporation, *Product Solutions; NBX NetSet Application Notes; NBX NetSett™ Administration Utility*, website printout, Dec. 14, 1998.

Microsoft Corporation, *Setting Up Your Microsoft Cordless Phone is Easy*, website printout, Dec. 15, 1998.

* cited by examiner

LUMINANCE MODULATION

DITHERING ENCODING

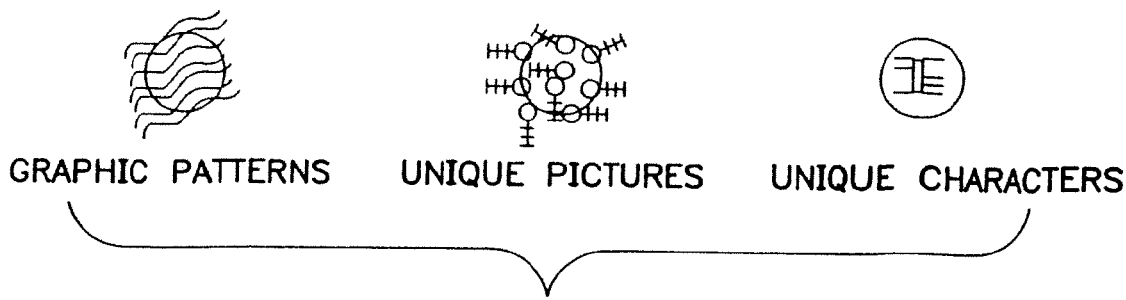
FIG. 9
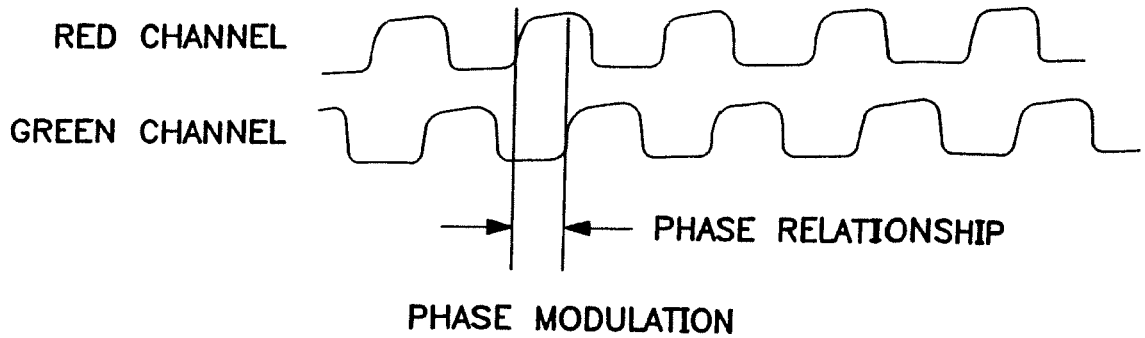
PHASE MODULATION
FIG. 10
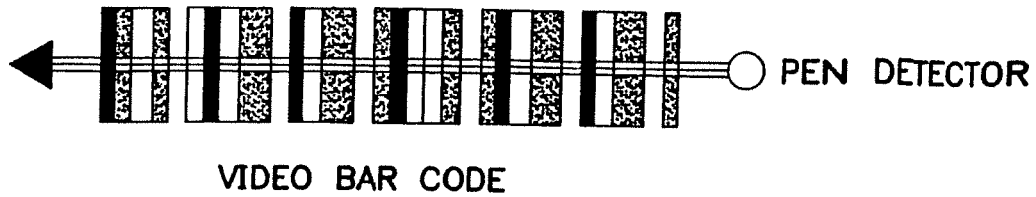
VIDEO BAR CODE
FIG. 11
SELF CLOCKING DATA ENCODING
FIG. 12

CRT photoresponse calibration sequence

METHOD AND APPARATUS FOR SETTING PROGRAMMABLE FEATURES OF AN APPLIANCE

RELATED APPLICATION

This is a continuation application of application Ser. No. 10/938,057, filed Sep. 9, 2004, now U.S. Pat. No. 7,215,746 which is a continuation of application Ser. No. 10/155,531, filed May 24, 2002, now U.S. Pat. No. 6,882,712 which is a continuation-in-part of application Ser. No. 09/415,299, filed Oct. 8, 1999, now U.S. Pat. No. 6,483,906, which is a continuation-in-part of application Ser. No. 09/351,270, filed Jul. 12, 1999, now U.S. Pat. No. 6,256,378, which is a continuation-in-part of application Ser. No. 09/235,709, filed Jan. 22, 1999 now U.S. Pat. No. 6,415,023.

BACKGROUND OF THE INVENTION

1. Field of the Invention

This invention relates generally to the field of setting programmable features of an appliance. More particularly, the invention provides a method and apparatus for conveniently setting various programmable features of an appliance using a graphical user interface accessed with a computer via a global computer network.

2. Prior Art

The advent of microprocessors and other miniaturized electronics has facilitated the implementation of increasingly complex functions in home and office appliances. Typically, a relatively complex operator interface is required in order to invoke the various functions that are available. For example, home electronic devices such as televisions, VCRs, stereo receivers and the like are typically provided with sophisticated remote control devices. Such remote control devices have a large number of individual buttons that are used to directly control features of an appliance and/or that are used to navigate through on-screen menus. Because of the sophistication and complexity of the controls, owner's manuals for appliances are becoming increasingly voluminous and difficult to comprehend.

Due to the growing complexity of modern appliances, many of the available features are never utilized by consumers, even as competition in the marketplace drives the proliferation of such features. A number of solutions have been proposed for making appliances easier to control and generally more "user friendly". For example, U.S. Pat. No. 5,553,123 issued to Chan, et al. discloses a method for downloading set-up data via a telephone to an appliance controller. A user first initiates a telephone call to a remote site having a computer. The user communicates certain background information to the remote site, and set-up data is then downloaded via the telephone connection. The earpiece of the telephone is held in proximity to a microphone built into the appliance controller in order to receive the downloaded data. Upon receipt of the data, the controller is configured to operate the appliance.

U.S. Pat. No. 5,600,711 issued to Yuen discloses an apparatus and methods for providing initializing settings to an appliance. When a user wishes to initialize the settings of an appliance, the user initiates a telephone connection with a remote site. The remote site then downloads a sequence of commands for initializing the settings in the appliance over the telephone connection. A remote control device for the appliance receives the sequence of commands and stores them in an internal memory. The remote control device is then aimed at the appliance and the user enters a command to transfer the stored sequence of commands to the appliance, thereby initializing the settings.

U.S. Pat. No. 5,141,756 issued to Levine discloses a method of initializing a programmable control device, such as a remote controller for a video cassette recorder. The device is programmed by connecting it to a telephone system, dialing a remote initializing center preferably employing a computer, and providing the computer with information as to the environment of the control device by using touch tone keys to respond to audio inquiries transmitted by the computer. The computer then transmits the initializing program for loading into the memory of the control device.

U.S. Pat. No. 5,774,063 issued to Barry, et al. discloses a method and apparatus for remote control of electronic devices from a computer. A transducer, such as an infrared transmitter, is coupled to a computer and aimed at an electronic device to be controlled. An application program running on the computer generates appropriate signals for control of the electronic device.

U.S. Pat. No. 5,815,086 issued to Ivie, et al. discloses a method and apparatus for communicating commands to electrical appliances from remote locations. Various appliances within a structure, such as a house, are coupled to a signal-conducting bus, such as the AC power wiring bus of the structure. Appliance commands are issued over the bus from a central transmitter. Appliances may be directly coupled to the bus or may receive commands via an infrared signal from an infrared transmitting device coupled to the bus. A handheld control device may be supplied for controlling the various appliances, in which case, receivers for the handheld control device are coupled to the bus in various parts of the structure.

U.S. Pat. No. 5,819,294 issued to Chambers discloses a programmable universal remote controller. A programming device is coupled to a computer and receives signals from conventional remote controllers. The programming device correlates the received signals with a database of stored signals used by various appliance manufacturers. The programming device then sends a complete set of appropriate control signals to the programmable universal controller.

U.S. Pat. No. 5,228,077 issued to Darbee discloses a universal remote controller that may be programmed from a remote location. The remote controller receives programming data via a video or telephonic data transmission system.

U.S. Pat. No. 5,488,571 issued to Jacobs, et al. discloses a system for transferring data from a video display monitor of a personal computer to a portable information device such as an appointment scheduling device. The video display is modulated to transmit data to an opto-electronic receiver in the portable information device.

Microsoft Corporation has introduced a cordless phone having programmable functions controlled by a personal computer. The base station of the phone is coupled to the serial port of a computer and application software is installed on the computer to control operation of the phone.

SUMMARY OF THE INVENTION

The present invention provides methods and apparatus for setting preferences and other parameters of an appliance. In preferred embodiments of the invention, a user initiates a connection to an interactive site on a global computer network. The site hosts a graphical user interface with which preferences and other parameters of an appliance may be set by the user. In some embodiments, set-up data for the appliance may be downloaded directly to the appliance from the user's computer or the interactive site. In other embodiments, set-up data for the appliance is downloaded from the user's computer or the interactive site to a transfer device where it is temporarily stored. The transfer device is then used to program the appliance. Since the appliance itself does not require a user interface for set-up procedures and programming, the appliance can be smaller, cheaper and lighter without sacrificing any functionality. In addition, the need for a printed user's manual is largely obviated since all of the information normally contained in such a manual can be obtained from the interactive site.

BRIEF DESCRIPTION OF THE DRAWINGS

FIG. 9 illustrates luminance modulation with irregular graphic patterns.

FIG. 10 illustrates bi-color phase modulation.

FIG. 11 illustrates video bar code modulation.

FIG. 12 illustrates a self-clocking data encoding scheme for use with the present invention.

DETAILED DESCRIPTION OF THE INVENTION

Figure 1:
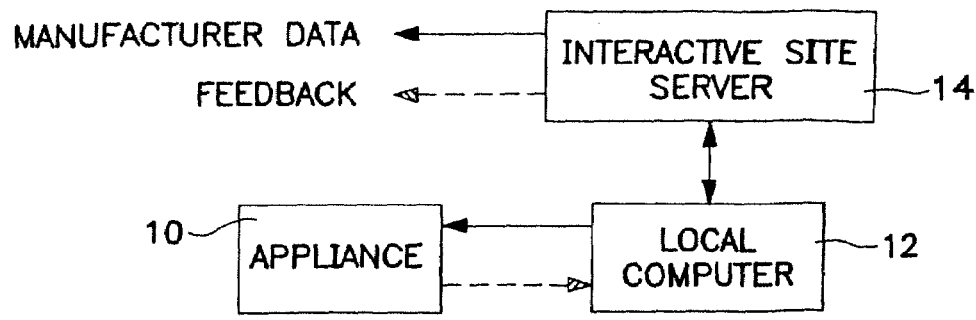
FIG. 1 is a functional block diagram of a first embodiment of the invention wherein an appliance receives data directly from a local computer.

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

The present invention finds application with a wide variety of home and office appliances. Some categories of appliances in which the invention may be utilized include clocks, telephones, televisions, television set-top decoders, video recorders, audio and video entertainment system components, refrigerators, conventional ovens, microwave ovens, dishwashers, irrigation systems, global positioning satellite (GPS) receivers, automobile heating, ventilating and air conditioning (HVAC) systems, automobile sound systems, home security systems, home HVAC systems, home master control systems, facsimile machines, copiers, cameras, postage meters, etc. "Programmable features" refer to any appliance features that may be altered. These include, for example, initialization or set-up parameters, stored data (e.g., telephone speed dial numbers or GPS receiver database) and the operating system or other internal software. Specific examples are given below to illustrate operation of the invention. However, it will be understood that the invention has general applicability to appliances of all types and to all types of programmable features within such appliances.

"Appliances" will be understood to include any device or system that has programmable features, including those that not normally thought of as "appliances." For example, an automobile has numerous on-board systems that are programmable in one way or another. Thus, the automobile itself may be viewed as an "appliance," as may the individual systems. In a similar vein, a residential dwelling contains a number of individual appliances. The dwelling, together with the individual appliances, may be viewed collectively as a single "appliance." This is particularly true if the individual appliances are connected to a home network. In this case, a single user interface may be provided to program the various systems and appliances of the dwelling. These may be communicated directly to a central controller on the home network or through a transfer device. A transfer device may be advantageously combined with a key to open the dwelling so that appliance features are programmed upon entering the dwelling. This is especially useful when there are multiple occupants in the dwelling. Each key may then carry the individual preferences of the respective occupant. Conflicts in preferences may be resolved through a priority hierarchy established when the preferences are programmed with the user interface. Of course, the invention is not limited to residential dwellings and may be employed as well with offices, stores and other habitable spaces.

The invention also has applicability apart from setting programmable features of appliances. For example, the invention may be employed to purchase pay-per-view programming at an interactive web site. An authorization code may then be downloaded into the transfer device of the invention and transferred to a TV set-top box so that the purchased program will be "descrambled". This approach eliminates the telephone connection required for most TV set-top boxes with pay-per-view capability.

Another potential application for the invention is as a programmable "token". For example, a consumer product manufacturer may offer discounts on certain of its products at its web site. Authorization to receive the discount may be downloaded into the transfer device of the invention and the transfer device may then be taken to a retailer. The transfer device is then used to transmit the discount authorization to a receiving terminal at the retailer. Ideally, the terminal would also have the ability to modify the stored contents of the transfer device so that the discount authorization could be cancelled once the discount is given. This same "token" approach can also be applied to pre-paid purchase transactions; reservations at restaurants, hotels, parks, etc.; entry authorization to entertainment venues or other secured areas and similar situations in which a conveniently transported authorizing token serves as an extended communication link from a computer system.

A first embodiment of the invention is illustrated in FIG. 1. An appliance 10 receives set-up data from a local computer 12. In a typical application, local computer 12 is a general purpose personal computer of the type now widely found in homes and offices. Details of computer 12 are not particularly relevant to the invention and are not shown. Typically, computer 12 will comprise, at a minimum, a processing unit, a keyboard and a display. Additional input devices, such as a mouse or other pointing device, and output devices, such as a printer, may also be included as part of computer 12.

Local computer 12 is coupled to a remote interactive site server 14 by a telecommunications link. In a typical embodiment of the invention, interactive site server 14 would be accessible via the World Wide Web. Other appropriate means for connecting computer 12 to server 14 could also be employed. Server 14 contains programming for interactively setting the programmable features of appliance 10. Preferably, server 14 presents to the owner of appliance 10, via computer 12, a graphical user interface that is tailored to appliance 10 and the programmable features thereof. Such interface can be thought of as a "virtual appliance". This can be better understood from the discussion of FIG. 4, below.

In the embodiment illustrated in FIG. 1, appliance 10 is coupled directly to local computer 12. This embodiment is best suited for portable appliances that may be conveniently carried to the computer for set-up. The coupling between appliance 10 and computer 12 may be one-way from the computer or two-way. One-way communication may be accomplished optically by providing appliance 10 with an optical sensor and modulating the display of computer 12 utilizing one or more of the techniques described below. Other communication techniques can be employed using audio, magnetic, inductive, infrared, or radio frequency coupling. Two-way communications are most conveniently established by connection to a serial port of computer 12. The serial port may be configured in accordance with any of the appropriate industry standards, such as, for example, Universal Serial Bus (USB), Fire Wire, etc. Naturally, this type of connection is not ideal for all appliances, but is particularly well-suited to portable appliances that may require a large amount of data. For example, loading data into a pocket organizer or similar type of personal digital assistant can be most conveniently accomplished with a serial port connection in the configuration illustrated in FIG. 1.

A two-way connection also allows "synchronization" of the real appliance with the virtual appliance. Even though most of the feature configuration of an appliance will be done using the virtual appliance interface, there may still be features and settings that can be controlled directly at the real appliance. By periodically reestablishing a two-way connection with the computer, the virtual appliance can be updated with any changes in the settings of the real appliance.

Another advantage of two-way communications is that it may be used to facilitate remote troubleshooting of appliances. Data from the appliance may be transmitted to computer 12, and from there to the appliance manufacturer or support facility via an Internet or email connection. Analysis of the data can then be used to issue appropriate repair orders. In some cases, repairs may be effectuated by downloading connective software or firmware in the same manner that appliance set-up is accomplished.

Some types of appliances can be readily adapted to utilize existing components for establishing communications with computer 12. For example, electronic cameras inherently possess optical sensors that can be used to sense modulation of a computer display screen or other light source. The primary imaging path of the camera may be used in the case of video cameras and digital still cameras. This simply requires the addition of circuitry and/or software to decode the modulation and store the appropriate set-up parameters. Alternatively, the receiver of the camera's focusing range finder may be used as the optical sensor.

In order to provide the appropriate interface for programming the features of appliance 10, server 14 preferably receives data from the appliance manufacturer. Such data may be received periodically as new model appliances are released by the manufacturer or may be obtained by server 14 in real time with a dial-up connection to the manufacturer. The latter approach offers the advantage of insuring that the most recent product information is available to server 14. One method of insuring that the appropriate information for appliance 10 is obtained by server 14 is to prompt the appliance owner to input the serial number of the appliance at computer 12. This need only be performed once, since the serial number can thereafter be stored in computer 12 and/or server 14 for use in subsequent programming of the same appliance. Warranty registration for the appliance may be conveniently performed during this same procedure.

An optional aspect of the invention is the ability of server 14 to provide valuable feedback to the appliance manufacturer. During appliance set-up operations, server 14 collects information concerning consumer's use of product features that can be useful in product marketing and new product design. The link between server 14 and the appliance manufacturer also facilitates new marketing opportunities. The manufacturer can readily target advertising to identified purchasers of its products. Also, the manufacturer can offer accessories and related products for appliance 10. Such offers may be integrated with the set-up interface or may be directed to the appliance owner separately by email or conventional mail. It should be appreciated that the invention can facilitate warranty registration. Since the appliance owner is already communicating with server 14 to set programmable features of the appliance, it is a simple matter to collect the additional information necessary to complete warranty registration and, if desired, to provide additional demographic data to the manufacturer.

Figure 2:
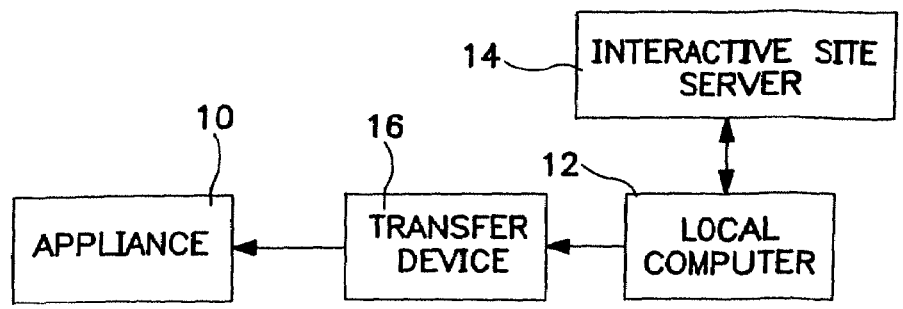
FIG. 2 is a functional block diagram of a second embodiment of the invention wherein an appliance receives data from a local computer via a transfer device.

FIG. 2 illustrates an alternative embodiment of the invention. This embodiment is similar to that of FIG. 1, except that programming data is provided to appliance 10 by a transfer device 16. This transfer device receives the programming data from local computer 12 by a wired connection to computer 12 or, by an opto-electronic or other wireless data link such as will be described more fully below. Furthermore, the transfer device may communicate with the appliance via a wired connection or via a wireless data link.

Figure 3:
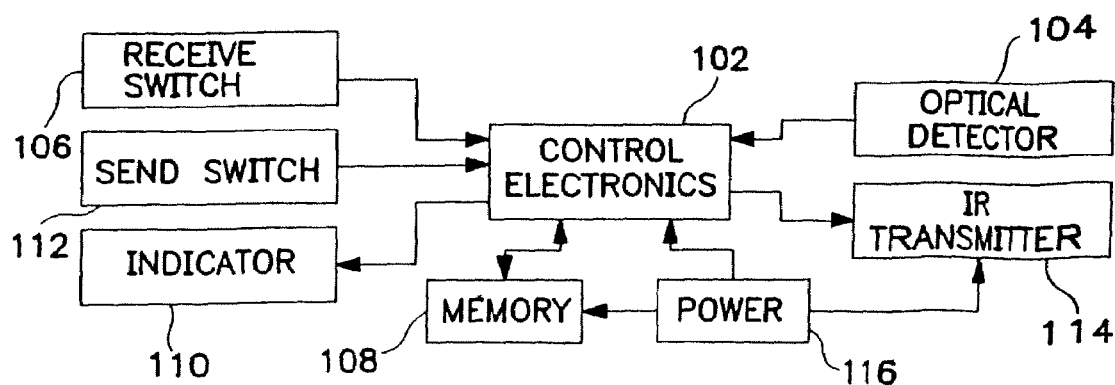
FIG. 3 is a functional block diagram of a transfer device as shown in FIG. 2.

FIG. 3 is a functional block diagram of a suitable transfer device 16. At the heart of device 16 is a control electronics module 102. Data modulated on the display screen of computer 12 is sensed by optical detector 104 upon activation of receive switch 106. The data is demodulated by electronics 102 and is stored in memory 108. Upon confirmation of error-free transfer and storage of the data, a suitable indication is provided to the user by means of indicator 110, which may be, for example, a light emitting diode (LED). With the data loaded in memory 108, transfer device 16 may be carried to appliance 10, which may include a "docking" port for transfer device 16. Thus, transfer device 16 may be an integral component of appliance 10, which is provided to the consumer by the appliance manufacturer. Alternatively, transfer device 16 may be connected to an input port of appliance 10 with an electrical cable or "tether" which may have a fixed or removable connection to the transfer device and/or the appliance. In still other embodiments, appliance 10 may be provided with an infrared receiver coupled to its internal control electronics. In the case of an IR link, transfer device 16 is equipped with an appropriate infrared transmitter 114 and is held in proximity to the infrared receiver of appliance 10. Upon actuation of transmit switch 112, the data stored in memory 108 is appropriately modulated by electronics 102 and applied to infrared transmitter 114. Indicator 110 may confirm to the user that the data has been transmitted. Alternatively, or in addition, an indicator may be provided on appliance 10 to signal receipt of the data. Power source 116, preferably in the form of common alkaline battery cells, provides electrical power to the components of device 16.

Transfer device 16 may be configured to transfer data from the appliance back to the computer as well. This facilitates synchronization of the virtual and real appliances as explained above. Data from the appliance may be loaded into the transfer device by means of an opto-electronic link in the same manner by which data is loaded from the computer. Preferably, however, the transfer device will have a direct electrical coupling to the appliance for applications involving two-way communications. Transfer of data into the computer may be accomplished in a number of ways. For example, transfer device 16 may couple directly to a serial or parallel input port of the computer as discussed previously, in which case a single physical port on the transfer device may serve as both input port and output port. Alternatively, transfer device 16 may include a sound transducer by which data may be transferred through a microphone coupled to the computer.

Transfer device 16 may be configured in various forms. Preferably, device 16 is easily portable. Device 16 may be in the form of a pen or wand with optical detector 104 and infrared transmitter 114 at one end. Transfer device 16 may also be integrated with a conventional remote controller for those types of appliances that are commonly controlled remotely. In another variation, transfer device 16 may be a removable module that is docked into appliance 10 as described above. In such case, communication between the transfer device and the appliance may be accomplished with a direct electrical connection through a suitable arrangement of electrical contacts. Transfer device 16 may, in fact, comprise the "brains" of appliance 10 in the form of a microprocessor or equivalent device. Aside from the ease of programming features and functions of the appliance, such an arrangement offers the added benefit of facilitating service or replacement of the appliance's electronic components in the event of malfunction.

Figure 4:
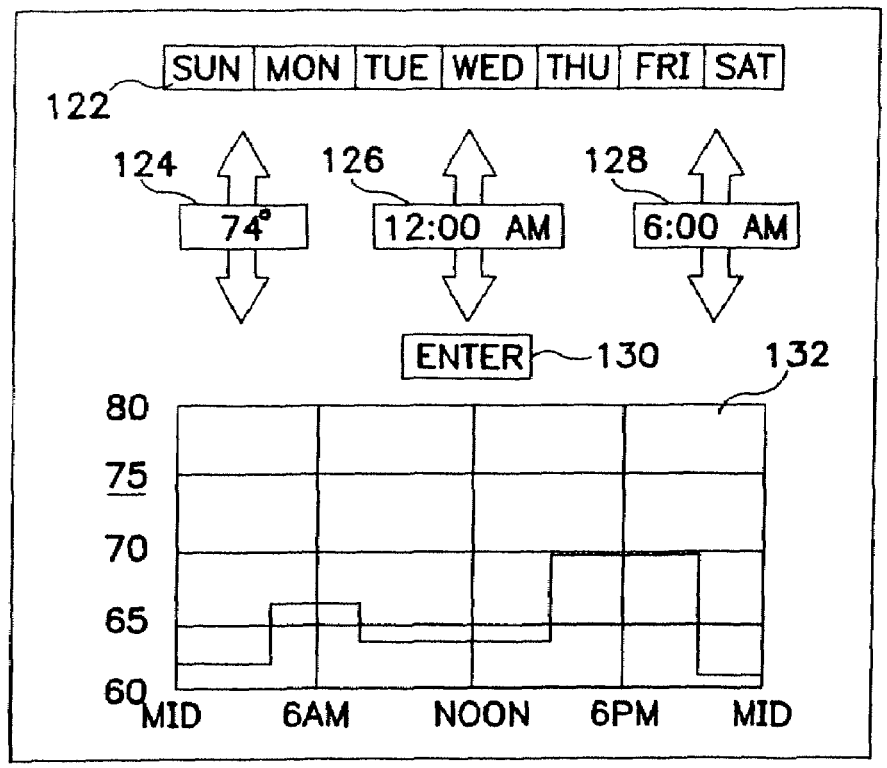
FIG. 4 illustrates a graphical user interface suitable for setting programmable features of a thermostat.

The embodiment shown in FIGS. 2 and 3 is particularly well-suited to appliances that are relatively fixed in position and that require only limited amounts of data. Examples of such appliances abound in the home and office. One such example is a thermostat for a home HVAC system. FIG. 4 illustrates a graphical user interface for a thermostat as presented on a display of computer 12. Such interface is shown merely for purposes of illustration, it being understood that the particular features of the interface are largely a matter of design choice.

Along the top of the display shown in FIG. 4 is a day strip 122. The user may select any one of the days with a cursor to program the thermostat settings for that day. Below the day strip is a temperature selector 124. Pointing at the up or down arrow with a mouse or other cursor positioning device, the user selects the desired temperature. To the right of temperature selector 124 there are a pair of time windows 126 and 128. Using the appropriate up and down arrows, the user selects the starting and ending times for which the temperature selection applies. When the desired settings have been made, the user selects ENTER button 130 to store the selections and then proceeds to make the next set of selections. For convenience, the ending time last entered may be automatically inserted into the starting time window. A graphical display 132 of the selected temperature profile may be provided for the user's convenience.

When all settings have been completed, the data is loaded into transfer device 16, which is then taken to the physical location of the thermostat for transfer of the data. Since all of the settings have been entered into computer 12, they may be conveniently saved locally and/or by server 14 for subsequent use in revising these settings or for reloading the settings in the event of a power failure. A printed record of the settings may also be made from computer 12. For some appliances, a print-out following a set-up procedure may be used as a template for the appliance to indicate selected options and programmed features. For example, certain appliances may have unlabeled function buttons for which a template may be made once selected functions have been assigned to the buttons during a set-up procedure.

It will be appreciated that a thermostat physically incorporating the interface shown in FIG. 4 would be quite large and costly in comparison to conventional thermostats. This is due primarily to the relative complexity of the interface, since the actual componentry to provide such flexibility of thermostat settings is actually quite small and inexpensive. Through use of the present invention, virtually unlimited flexibility in thermostat programming may be accomplished with a thermostat that is no larger and no more costly than a conventional thermostat. Indeed, a thermostat as just described could easily be made the size of a postage stamp.

Another example of an "appliance" to which the present invention can be advantageously applied is the modem automobile. The driver interface for automobiles has become more and more complicated as more and more electronic and computer driven features have become available. Seat position and temperature, mirror position, audio entertainment settings, HVAC settings and navigational settings can all be set electronically. Many of the available settings are changed only infrequently, and thus may require reference to the owner's manual in order to change the settings manually. Naturally, different drivers have different preferences and this can result in a lengthy process of changing settings each time a different driver enters the vehicle. The present invention provides a convenient way to communicate driver preferences to the various electronic systems of an automobile. As explained above, a driver can set many of the desired preferences using an interactive program with a graphical user interface. A transfer device is then used to communicate the preferences to the automobile. In this particular example, the transfer device may also function as a key to enable operation of the automobile. Certain preferences, such as seat position and mirror position that are established in the automobile itself can be stored in the transfer device along with the preference data downloaded from the driver's home computer.

Use of the present invention facilitates customized driver controls. For example, touch screen display panels are now used in many automobiles. Using a graphical user interface, a driver can design a customized set of controls for operating features of interest to that driver. One driver may wish to have certain radio selections readily available, whereas another driver may wish to have available a selection of destinations for the navigation system. These preferences are communicated via the transfer device as described above. Controls that are customized in this manner are not limited to touch screen selections. By the same process, driver defined functions may be assigned to buttons, dials and other mechanical controls as well to create individualized "function keys." Furthermore, it will be appreciated that creating customized controls in this manner is not limited to the context of automobiles, but may be applied to any type of appliance.

Figure 5:
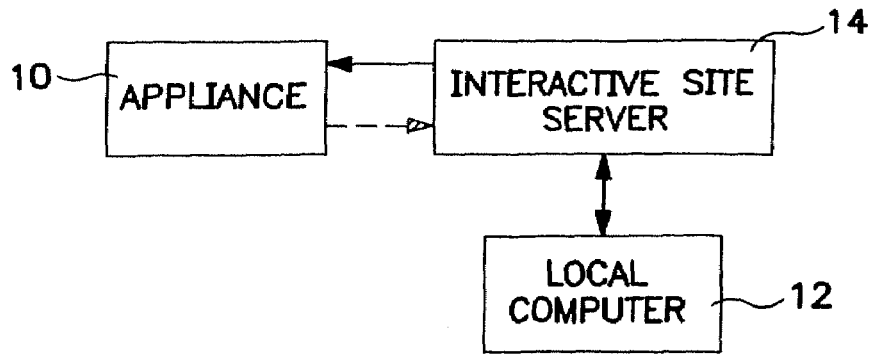
FIG. 5 is a functional block diagram of a third embodiment of the invention wherein an appliance receives data directly from an interactive site server.

FIG. 5 illustrates another alternative embodiment of the invention. In this case, data for appliance 10 is received directly from server 14 rather than local computer 12. From the appliance owner's perspective, the appliance programming interface is otherwise identical to the previously described embodiments. Communication between server 14 and appliance 10 may be telephonic. Appliance 10 may incorporate a conventional modem, in which case communications may be two-way, or may simply have a data demodulator for one-way communications. Coupling of appliance 10 to the telecommunications network may be by a conventional RJ-11 connection. Alternatively, appliance 10 may incorporate a cordless telephone module for communicating with a separate base station. Communications between server 14 and appliance 10 could also be implemented with radio signals. For example, appliance 10 could incorporate a conventional paging receiver.

A particular example of the embodiment illustrated in FIG. 5 is a programmable telephone. Speed dial numbers and other programmable features of a telephone may be conveniently set using a graphical user interface hosted by server 14. Once the features have been programmed by the user, server 14 simply places a call to the telephone. Appropriate data demodulation circuitry is incorporated in the telephone in order to download the data from server 14.

Figure 6:
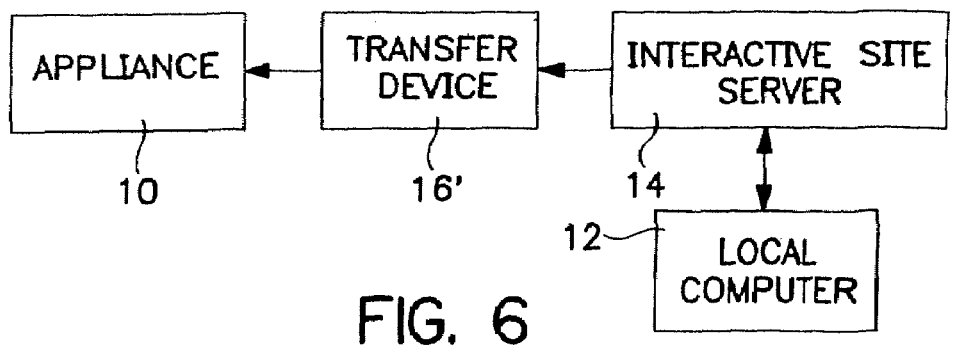
FIG. 6 is a functional block diagram of a fourth embodiment of the invention wherein an appliance receives data from an interactive site server via a transfer device.

FIG. 6 illustrates a further embodiment of the invention generally similar to that of FIG. 5, but incorporating a transfer device as in the embodiment of FIG. 2. Here, however, transfer device 16' receives data directly from server 14. As with the previously described embodiment, communication between server 14 and transfer device 16' may be telephonic or by radio. One example of a transfer device 16' is embodied as a removable module or "card" of a telephone. Data for an appliance 10 is downloaded from server 14 to the telephone where it is demodulated and stored in the card. The card may then be taken to appliance 10 to transfer the data to the appliance with an infrared or other data link.

Another embodiment of the invention as illustrated in FIG. 6 is a "universal" remote controller that may be coupled to a telecommunications network by means of an RJ-11 jack or equivalent in the manner disclosed by Darbee in U.S. Pat. No. 5,228,077. The remote controller could thus function as a data transfer device in addition to its more conventional remote control functions.

As discussed above, the transfer device or appliance of the present invention preferably receives data by means of an opto-electronic data link. Any suitable source of light modulation may be employed to transmit data to the transfer device or appliance. These include LEDs, incandescent bulbs, LCDs and CRTs. A convenient source of light modulation is the display screen of a local computer. At least a portion of the display of the local computer may be modulated to transmit data to the transfer device.

Most current approaches to video modulation data transfer use sequential pulsing of the video image to provide a series of binary 1's and 0's. These binary bits are used with framing bits (start and stop bits) to form complete data bytes. Some of the current approaches rely on the scanning CRT image to serialize the data bits by providing a luminance pulse for each data bit. This approach will fail when applied to flat panel LCD screens because these screens do not have a scanning luminance response like that found with the CRT.

Other methods provide a binary bit stream where each bit is produced at the video field rate. For a typical CRT, this provides one binary data bit each 16 msec. (60 fields per second). While this approach is viable for the CRT, it will not work well for flat panel displays. The slow response time of LCD panels mean that only a small number of data bits could be transferred per second. For a passive display, 3 bits would be possible (assuming 300 msec. response time). For active panels, 20 bits could be transferred. Using conventional start and stop bits, a passive panel would then be capable of transmitting 0.3 bytes per second and active panels 2 bytes per second. This is too low a data rate for many applications.

Various modulation schemes are proposed below that are suitable for use with both CRT and LCD displays.

1. Luminance Modulation

Figure 7:
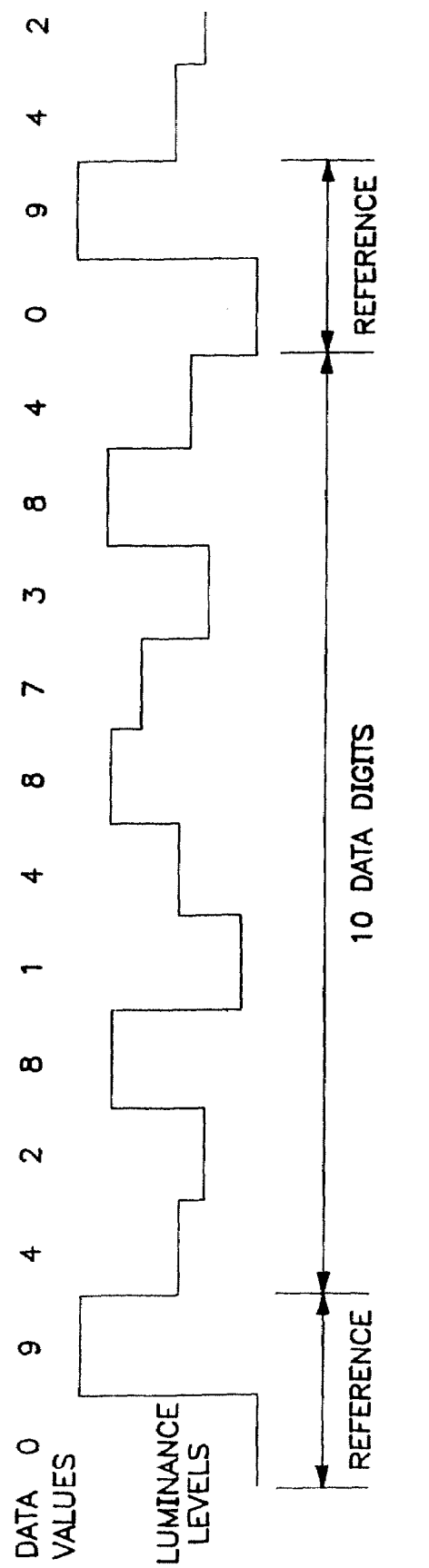
FIG. 7 illustrates luminance modulation for transferring decimal data digits.

A first approach to data modulation of a display screen employs luminance modulation. This method drives the display with varying levels of intensity. Each intensity level can represent an entire data digit. For example, FIG. 7 illustrates a method using 10 shades of gray to represent a decimal digit. The luminance level for each successive decimal digit or luminance "dwell" is generated as fast as the display can accommodate. For an active matrix LCD panel, 20 dwells could be sent in one second. This allows 20 digits of information per second, which is substantially faster than sending binary data.

The luminance levels are detected by a photodetector in a receiving device. Discrete luminance levels can be generated using several different methods:

a) Gray Scales

This method drives a spot on the display to one of several discrete shades of gray. The photodetector in the receiving device can detect the discrete levels and convert each level into a single digit value. Reference levels can also be sent periodically in the data stream to establish the black and white (highest/lowest) luminance levels. This allows the photodetector output to be scaled to more accurately detect each discrete gray level. One limitation to this method is that the gray scale response of the display may not be linear. In fact, gray scale levels are greatly affected by the monitor's contrast and brightness controls. These controls can be changed by the user and are not predictable or known constants.

b) Chromatic Luminance

It is possible to convey various luminance levels by selecting different color combinations. Each color has a luminance component combined with a chroma component. Selecting different colors also selects different luminance levels. For example, dark brown has a low luminance while cyan has a high luminance. Note that what is being detected with this method is luminance—not color. Accurate luminance detection depends on the color response of the display, the monitor contrast, brightness and color settings, and the color response characteristics of the photodetector. Accurate detection using this method typically requires some form of calibration to match the photodetector response to the display color response.

c) Dithering

Figure 8:
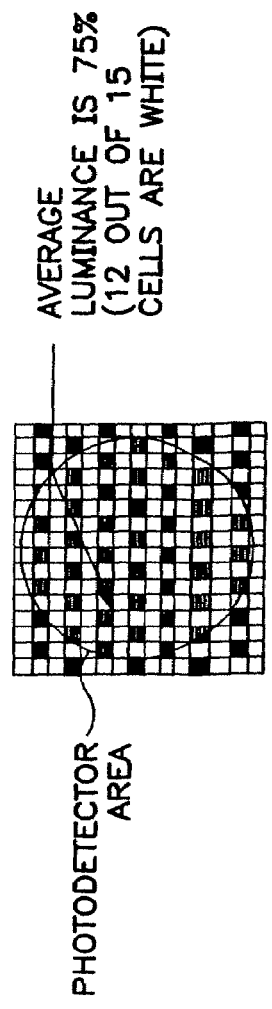
FIG. 8 illustrates luminance modulation with dithering encoding.

With reference to FIG. 8, the currently preferred method displays a regular pattern of black and white pixels within a region of the display to produce an average luminance level. This "dithering" average level is created by dividing the entire detection region into a matrix of smaller discrete cells comprising one or more pixels. Each cell is either driven full white or full black. The ratio of black to white cells determines the overall, average luminance for the detection area. This method eliminates problems with unpredictable gray scale response in the display due to contrast or brightness settings.

The dithering approach illustrated in FIG. 8 uses a rectangular matrix to obtain an average luminance for a given area. It is also possible to display other graphic patterns or characters which have a distinctive appearance while also presenting an average overall luminance. Some examples are shown in FIG. 9. Each of these have a unique luminance level when the black areas are averaged with the white background. This allows the photodetector to discriminate between unique patterns or characters to convert to a corresponding data value.

d) Multi-Color Modulation

Another method is to use two or more color channels to provide a means of data modulation. For this method two or more photodetectors are used, each responsive to different portions of the color spectrum. For example, separate red and green photodetectors could be used to detect varying shades of each color. Using two channels allows data encoding using the luminance level of each color channel, or the phase between two color signals. Phase modulation works by modulating the color channels at a given rate, but varying the phase relationship between the two channels as shown in FIG. 10.

To further increase the data density, it is possible to combine modulation of color luminance with color phase. Thus at any given sample interval, three parameters are available: red intensity, green intensity and phase relationship. If eight discrete values of each parameter are used, each sample point can represent $8^3$ values or 1 of 512 discrete numerical values per sample. A disadvantage to this method is the requirement for two color-selective detectors. Also, color response can vary between displays, so some type of color calibration may be required.

2. Video Bar Code

FIG. 11 illustrates another method of data encoding using video bar code modulation. This approach is similar to printed bar codes, but uses a higher density data coding. With this method, a video bar code is displayed across the screen. The user swipes a receiving device across the bar code to read data from the screen. Conventional printed bar codes work by using different spaces between vertical lines. The spacing relationship is translated into binary data bits. Multiple bits are combined to form bytes of data.

Using a video image, data can be represented using luminance levels or color. This allows higher data density because each "bar" in the video bar code can represent an entire decimal digit instead of just a single binary bit. This increases data density by 8 to 10 times compared to conventional bar codes.

FIG. 11 illustrates a video bar code using luminance levels. Note that luminance levels can be generated using the same methods as previously described for spot modulation. Each bar represents one of many luminance levels, for example, with 10 luminance levels each bar can represent a digit value of 0 to 9.

3. Color Modulation

Chromatic luminance modulation was described above as a form of intensity modulation. It is also possible to employ a true color modulation in which specific color hues are used to represent corresponding numerical values. Depending on the range of hues used, an array of two or three separate detectors sensitive to different spectral components, such as by using appropriate filters, is required. A beam splitter may be employed to direct light to the individual detectors of the array in the receiving device.

4. Self Clocking

Regardless of the method of modulation employed, it is desirable that the data transmission be self-clocking. This means that individual data characters are detected by the receiving device without precise time spacing between characters. This self-clocking approach allows for pauses to occur during the transmission of data characters without creating transmission errors. Pauses can occur in PCs if the operating system performs another task while the transmission is active. For example, multitasking operating systems will commonly write data between memory cache storage and disk drives. This activity can preempt the operation of other software and cause short pauses in the operation of lower level applications. For internet based data transfers, varying delays are also common when moving data between servers and client PCs.

It is also important to accommodate different data rates depending on the type of display monitor being used. Prior to starting the data transfer, the user can make a selection to indicate the type of display being used. If the display is a CRT, a faster transfer rate may be used (up to 75 digits per second). If an active matrix display is being used the transfer rate will be slower (20 digits per second). While the selection of transfer rate is easily accomplished on the PC side, the receiving device will preferably be compatible with all available transfer rates. Using self clocking data allows the receiving device to receive data at the transmission rate, without the need for a data rate selection on the receiving device itself.

An efficient self-clocking method using a non-binary data encoding is illustrated in FIG. 12. If luminance modulation is used the receiving device can detect each discrete luminance level change as a new digit. The length of time between successive digits is irrelevant. If the same digit value is sent twice in succession, a special "repeat" character can be used to indicate that the last digit value is repeating. As shown in FIG. 12, 11 indicates a repeating digit value. If the data stream contains three successive 4's, the encoded data will be 4-11-4. With this approach a single digit value is never repeated twice in succession. The detector can simply wait for each change in luminance level to indicate a new digit value has been sent. Timing relationships between characters is not significant.

5. Time Interval Modulation

In contrast to self-clocking methods, another modulation approach is based on the time spacing between changes in intensity level or color. With this approach, only a limited number of intensity levels or colors is required. The number of discrete intensity levels or colors may be as few as two. The time interval between changes in intensity level or color has a number of possible discrete values, each of which corresponds to a numerical value. A significant advantage of this approach is that it is not sensitive to variations in display intensity or color fidelity. However, due to the characteristic response times, this approach is better suited to CRT displays than to LCD displays.

6. Receiving Device

Figure 13:
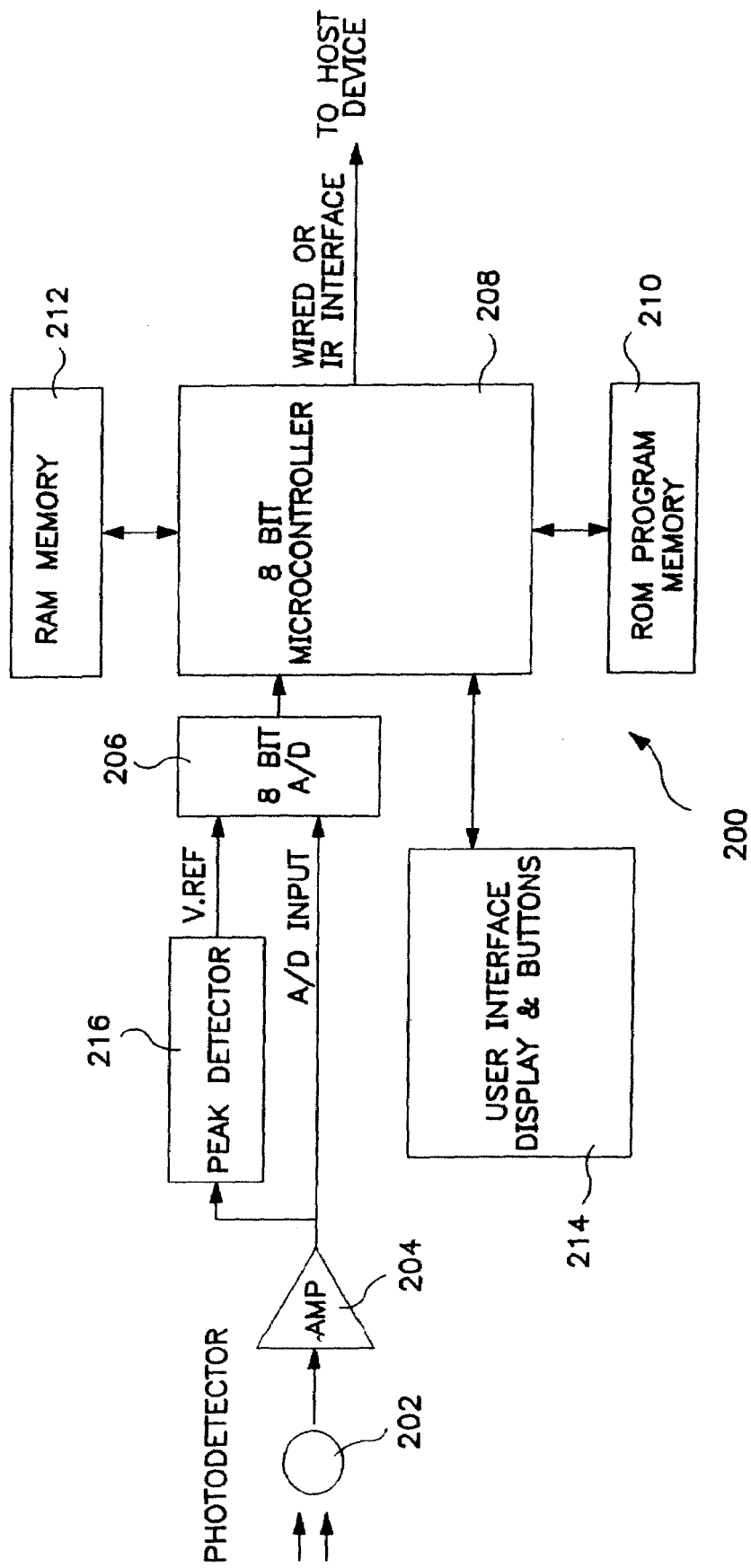
FIG. 13 is a functional block diagram of a receiving device suitable for use with the present invention.

FIG. 13 is a block diagram of a receiving device 200 suitable for use in connection with the present invention. Light emitted by (or reflected by) a display panel falls on photodetector 202. The output of the photodetector is amplified by amplifier 204 and asserted at the input of the analog-to-digital (A/D) converter 206. The digitized output, in this case comprising an 8-bit word, is presented as an input to microcontroller 208. The operation of microcontroller 208 is controlled by program instructions stored in read only memory (ROM) 210. These instructions govern the conversion of the raw digitized input from A/D converter 206 into a data digit. The data digits are further processed in accordance with the particular functions to be accomplished by receiving device 200. When configured as a transfer device, such as transfer device 16 discussed previously, receiving device 200 will further communicate the data digits or information derived therefrom to a host device via a wired or wireless interface. A random access memory (RAM) 212 is coupled to microcontroller 208 for use as a scratchpad memory, the use of which may include temporary storage of the data digits received from A/D converter 206 or information derived therefrom. In many applications, receiving device 200 will include a user interface 214 comprising a display and/or various controls, such as function selection buttons and the like. Receiving device 200 may also include a provision to allow for automatic calibration of the analog to digital converter. A peak detector 216 detects the peak white level in the received signal. This level is used to establish the upper range of A/D converter 206. This allows the full range of the A/D converter to be used over the receiver's data detection range.

Receiving device 200 may be configured in any convenient form. As discussed above in connection with transfer device 16, receiving device 200 may have an elongated cylindrical shape similar to a pen or a wand. In such case, photodetector 202 may be conveniently located at one end of the device. However, it has been found that pen- or wand-shaped devices have disadvantages when used with LCD flat screen displays. If the device is pressed against the display, even with light pressure, the display may be distorted, thereby affecting the accuracy of the data transfer. For flat panel displays, a flat, card-shaped receiving device is preferred. Such a device may be held against the display screen without distorting the display.

Figure 14:
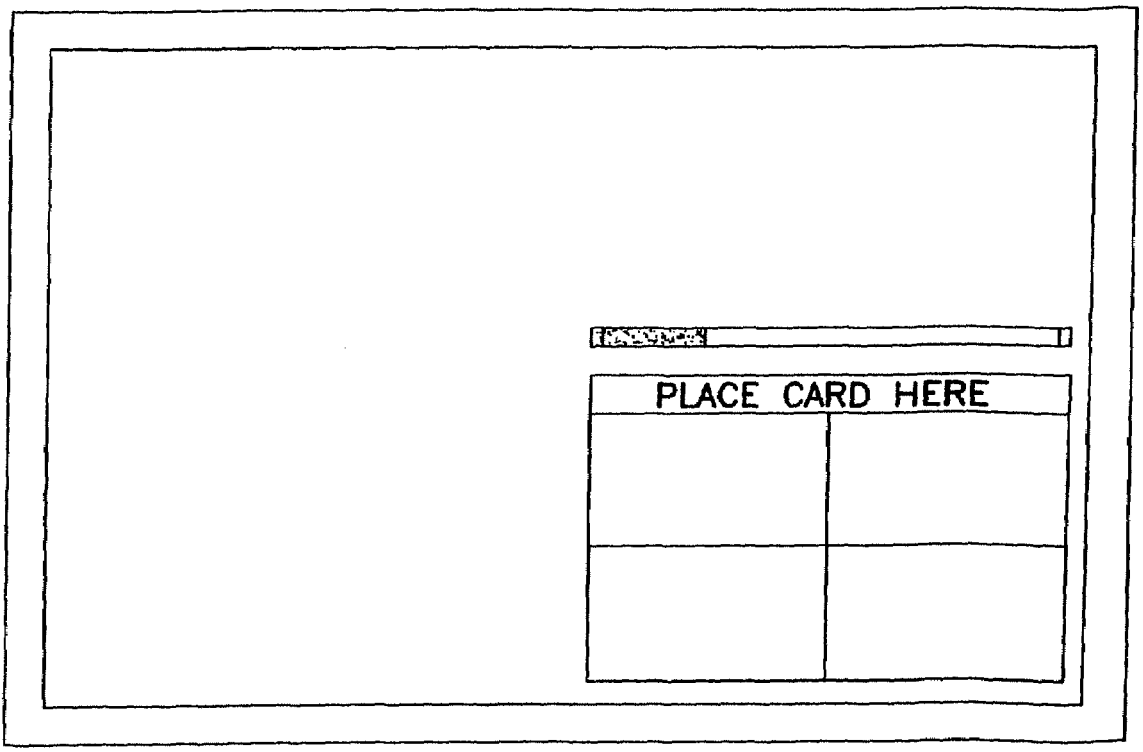
FIG. 14 illustrates a display screen having a portion thereof for data transfer.

To ensure proper registration of the receiving device with the display screen, a visual indication of the area of the display screen that will contain the data modulation is preferably provided. As shown in FIG. 14, a rectangular area of the display screen, generally corresponding in size and shape to the card-shaped receiving device, may be configured as a window and may be labeled with a legend such as "place card here".

In the examples discussed above, a single photodetector (or paired detectors in the case of bi-color modulation) is used in combination with a single modulated region of the display screen. It will be appreciated that the data transfer rate can be multiplied by employing a suitable array of photodetectors in combination with a corresponding array of data transmission regions. Obviously, the array of detectors must be properly registered with the array of modulated regions on the display. This can present a challenge in the case of a handheld receiving device. One solution to this challenge is illustrated in FIG. 14. Here, the display is divided into four quadrants that are independently modulated. The receiving device includes an array of four independent photodetectors. By providing simple registration marks on both the display screen and the receiving device, the receiving device can be held against the display screen so that the photodetectors are in proper registration with the corresponding quadrants.

7. Experimental Results

A prototype system has been constructed. The prototype receiving device is configured as a card having the same length and width as a standard credit card. A 9 mm round photodetector element is located in the center of one face of the card. Electronic circuitry within the card amplifies the output signal of the photodetector, which is then applied as an analog input to a conventional personal computer system where A/D conversion is performed. The photodetector element is designed to detect the average luminance over a 9 mm round area of the display screen. The detector consists of a translucent glass window and a photo-Darlington transistor photodetector mounted in a plastic enclosure.

The prototype system employs luminance modulation using the dithering approach discussed above. A total of 12 luminance levels are used to represent ten decimal values plus two additional values to indicate formatting and repeating characters. Using a CRT display, the prototype system has achieved data transfer rates of 20 characters per second.

Figure 15:
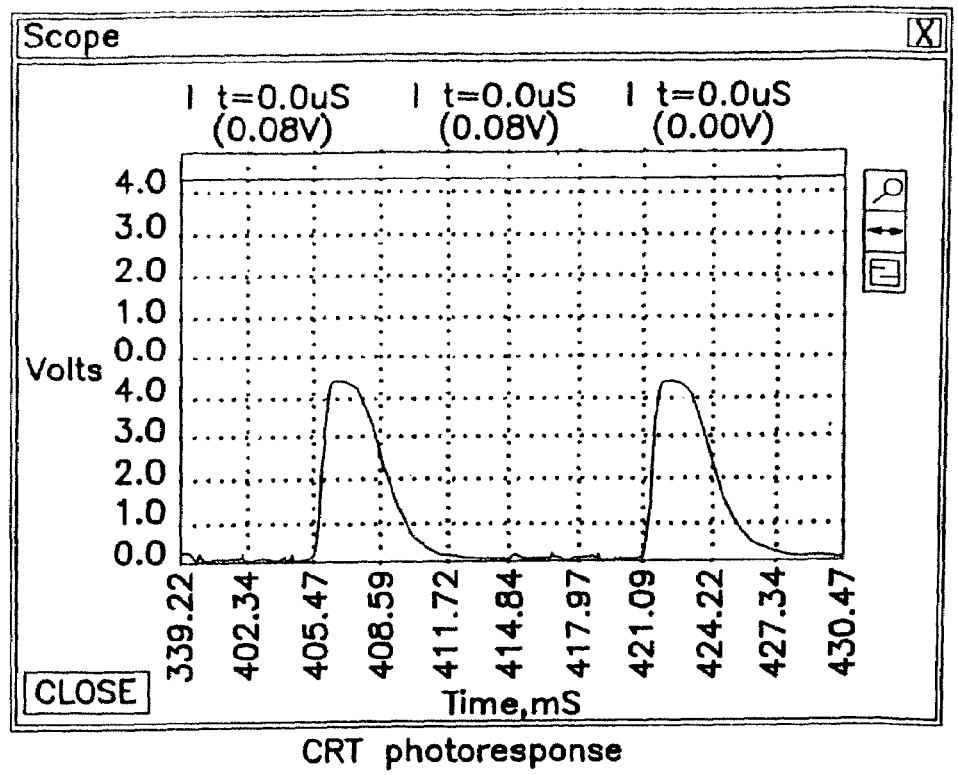
FIG. 15 is a plot of CRT photoresponse of a prototype system constructed in accordance with the present invention.

The photodetector in the receiver detects the luminance change as the electron beam in the CRT passes over the detector. This screen phosphor glows with a brightness related to the average screen luminance. For a CRT display, the beam is constantly scanning the screen. This creates a pulse as the beam passes over the detector. Therefore, the signal detected is a pulse which repeats at the frame rate of the display (typically 13 to 17 msec. per field). FIG. 15 is an actual capture of the signal received by the detector using a CRT-based display.

Since the received signal is a pulse, a software algorithm processes the A/D conversion readings in order to establish the luminance level represented by the peaks of the detected pulses. The software algorithm is then capable of decoding these levels back into packets of data.

It is desirable for the system to automatically adapt to varying intensity levels on the display. Different luminance levels will result due to variances in the brightness response of the display, the sensitivity characteristics of the photodetector and also due to adjustment of the brightness and contrast settings of the monitor.

Figure 16:
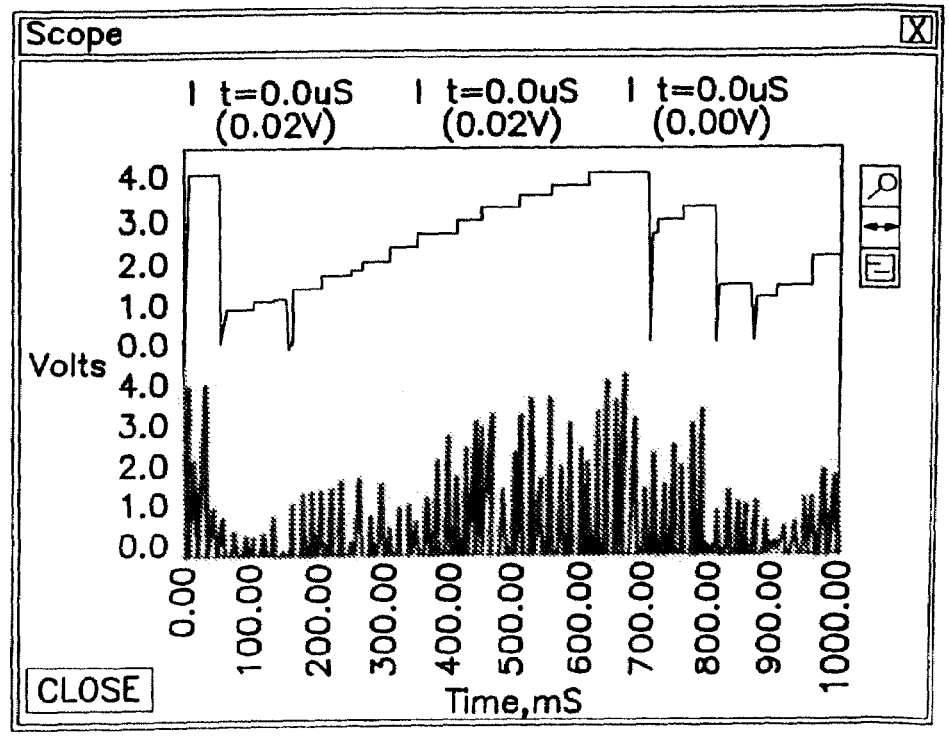
FIG. 16 is a plot of a calibration sequence used in the prototype system.

To automatically adjust for these differences, the system provides a calibration sequence at the start of each data transmission. As illustrated in FIG. 16, the calibration pattern consists of a staircase of each of the 12 luminance levels used. A full white pulse (level 12) is sent at the start of the sequence, followed by values of 0 to 12. This signal is detected by the receiver and used to establish the actual 12 discrete levels obtained from the monitor. In FIG. 16, the bottom signal is the actual pulse waveform received by the photodetector. The top signal is that obtained after processing by a software algorithm.

It will be recognized that the above-described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A method for setting programmable features of an appliance comprising:

operating a graphical user interface using a user's computer, said graphical user interface having a virtual appliance that graphically depicts programmable features of a corresponding real appliance;

entering data with the user's computer to set programmable features of the virtual appliance to generate set-up data;

providing a portable transfer device separate from the user's computer having an input port and an output port;

coupling the input port of the transfer device to the computer;

transferring the set-up data from the computer to the transfer device;

coupling the output port of the transfer device to the appliance; and transferring the set-up data from the transfer device to the real appliance.

2. The method of claim 1 further comprising inserting the transfer device into a docking port in the real appliance.

3. The method of claim 2 wherein the output port of the transfer device and the docking port have cooperating electrical contacts.

4. The method of claim 1 wherein the input port of the transfer device is coupled to a serial port of the computer.

5. The method of claim 4 wherein the input port of the transfer device is plugged into the serial port.

6. The method of claim 4 wherein the input port of the transfer device is coupled to the serial port by a cable.

7. The method of claim 1 further comprising:
setting programmable features of the real appliance by user input at the real appliance;
coupling the transfer device to the computer; and
transferring the user-input settings to the computer.

8. The method of claim 1 wherein the transfer device comprises a key to operate the real appliance.

9. The method of claim 1 wherein the programmable features comprise internal software of the real appliance.

10. The method of claim 9 wherein the internal software comprises operating system software.

11. The method of claim 1 wherein the programmable features comprise a control having a user-assigned function.

12. A method for setting a programmable feature of an appliance comprising:
providing a remote interactive site;
establishing a connection with the interactive site;
interactively setting a programmable feature of the appliance at the interactive site;
transferring set-up data for the programmable feature from the interactive site directly to the appliance.

13. The method of claim 12 further comprising:
setting a programmable feature of the appliance by user input to a control physically associated with the appliance;
transferring the user-input setting of the programmable feature from the appliance to the interactive site.

14. The method of claim 12 wherein the connection with the interactive site is established with a telecommunications link.

15. The method of claim 12 wherein the interactive site is accessed using a global computer network.

16. A method for enabling end users to set a programmable feature of an appliance comprising:
hosting a remote interactive site;
accepting a connection with the interactive site by an appliance user;
enabling the appliance user to interactively set a programmable feature of the appliance at the interactive site;
transferring set-up data for the programmable feature from the interactive site directly to the appliance.

17. The method of claim 16 wherein the connection with the interactive site is established with a telecommunications link.

18. The method of claim 16 wherein the interactive site is accessed using a global computer network.

19. A method of controlling a feature of an appliance comprising:
providing a remote interactive site with a graphical user interface tailored to an appliance and the programmable features thereof;
accessing the remote site with a user's computer and operating the graphical user interface to program a selected appliance feature;
transferring data for programming the selected appliance feature to an appliance remote from the user's computer.

20. The method of claim 19 wherein transferring data for programming the selected appliance feature comprises transferring the data to a transfer device and then transferring the data from the transfer device to the appliance.

21. The method of claim 19 wherein transferring data for programming the selected appliance feature comprises transferring the data from the remote site to the appliance.

22. The method of claim 21 wherein the data is transferred from the remote site to the appliance via telephonic communications.

23. The method of claim 19 wherein transferring data for programming the selected appliance feature comprises transferring the data from the user's computer directly to the appliance.

24. The method of claim 19 wherein the remote site is hosted on a server accessed via a global computer network.

* * * * *